United States Patent
Blouin

[19]
[11] Patent Number: 5,977,867
[45] Date of Patent: Nov. 2, 1999

[54] TOUCH PAD PANEL WITH TACTILE FEEDBACK

[75] Inventor: François Blouin, Hull, Canada

[73] Assignee: Nortel Networks Corporation, Montreal, Canada

[21] Appl. No.: 09/086,347

[22] Filed: May 29, 1998

[51] Int. Cl.[6] .................................................. H04B 3/36
[52] U.S. Cl. .................................. 340/407.2; 340/407.1; 340/825.19; 340/825.46; 340/665; 345/173; 345/177; 345/179; 178/18.04; 178/18.01; 178/18.03; 178/19.02; 341/21; 341/27
[58] Field of Search ................................ 340/665, 407.1, 340/825.46, 825.19, 407.2; 364/709.15; 345/173, 179, 177; 178/18.01, 18.03, 18.04, 19.01, 20.04, 19.02; 341/21, 27

[56] References Cited

U.S. PATENT DOCUMENTS

| | | | |
|---|---|---|---|
| 4,078,257 | 3/1978 | Bagley ................................ | 364/709.15 |
| 4,885,565 | 12/1989 | Embach ................................ | 340/407.2 |
| 5,036,239 | 7/1991 | Yamagochi .............................. | 310/268 |
| 5,189,355 | 2/1993 | Larkins et al. ........................... | 318/685 |
| 5,412,189 | 5/1995 | Cragun ................................... | 235/379 |
| 5,600,777 | 2/1997 | Wang et al. ............................. | 395/326 |
| 5,638,060 | 6/1997 | Kataoka et al. .......................... | 341/20 |
| 5,767,457 | 6/1998 | Gerpheide et al. ....................... | 178/18 |

OTHER PUBLICATIONS

Philips Velo 1 User's Guide publication No. 000–46356; V1UG197V1—1998—p. 31.
Dynapro Systems Inc. Touch Screen Drawing 95647—Dynapro website: www.dynapro.com—products.

*Primary Examiner*—Benjamin C. Lee
*Attorney, Agent, or Firm*—Gowling, Strathy & Henderson; Ed Rymek

[57] ABSTRACT

A touch pad such as a keypad or a touch screen is mounted with at least one vibrator to produce a tactile feedback sensed by the user as the pad is touched with a finger or a pointer. The vibrator is controlled by a processor such that it will vibrate for a predetermined length of time in the range of 50 to 1000 ms and at a predetermined amplitude. The vibrator is also selected to vibrate at a frequency between 100 and 5000 hz. The touch screen may be any of the analog resitive, infrared, accoustic, capacitive or electromagnetic inductive type operated devices.

8 Claims, 1 Drawing Sheet

TOUCH PAD PANEL WITH TACTILE FEEDBACK

FIELD OF INVENTION

This invention relates to touch pads such as touch screens and in particular to touch pads that provide a tactile feedback to the user.

BACKGROUND OF THE INVENTION

Over the years many types of touch pads such as touch screens have been developed for use with processors as user input components. These pads were initially used with major display units, but most recently they are dominant input devices for lap top and hand held computers, notepads and communications devices.

The touch pads may have discrete key locations such as keypad elastomers laid over printed circuit boards or touch screens such as analog resistive, infrared, accoustic, capacitive or electromagnetic inductive operated screens. These touch pads have a common problem in that they do not always provide the user with a satisfactory tactile feedback. The completion of a keystroke on a keypad can usually be seen on the user's screen, but cannot be felt. In addition, touch screens are flat, they do not have any curvature, and therefore no feedback or key travel occurs during a keystroke. This is particularly true for the analog resistive, infrared, accoustic and capacitive screens that are capable of finger as well as pen input. The electromagnetic inductive screen is only capable of a pen input, since the pen picks up a signal from a sensor plate.

Users are uncomfortable when using such devices in that they do not sense having completed a keystroke. Providing some form of tactile feedback when the pad is touched to input a certain key function is essential for good man-machine interface. Prior art devices presently use sound to provide feedback to the user. The feedback is normally in the form of a beep or click, as exemplified in the Philips Velo 1 handheld PC. This feature is noted in the Velo 1 User's Guide on page 31—Adjusting volume and sounds, and in particular the Key Clicks. The Guide which is identified as publication number 000-46365; V1UG197V1 was published in 1998.

SUMMARY OF THE INVENTION

It is therefore an object of the present invention to provide a touch pad with tactile feedback.

It is a further object of this invention to provide a touch pad system for providing a user tactile feedback when the pad is touch activated.

This and other objects are achieved in a touch pad having a surface to be touched by a user for providing an output as a function of the location touched on the surface and a tactile feedback device fixed to the touch pad surface for providing a tactile sensation to the user.

In accordance with another aspect of this invention, a touch pad system includes a touch pad, a touch pad controller for detecting and providing data representative of the point on the screen being touched by a user, a processor for processing the data from the controller and a tactile feedback device fixed to the touch pad to provide a tactile feedback sensation to the user under the control of the processor as the pad is being touched.

In accordance with a further aspect of this invention, the touch pad is a touch screen and the tactile feedback device consists of at least one vibrator fixed on the periphery of the screen.

In accordance with another aspect of this invention, the vibrators are operated at frequencies between 100 and 5000 hz for pulse widths of 50 to 1000 ms.

Many other objects and aspects of this invention will be clear from the detailed description of the drawings.

BRIEF DESCRIPTION OF THE DRAWINGS

Embodiments of the invention are described in the drawings in which.

DETAILED DESCRIPTION

Figure 1:
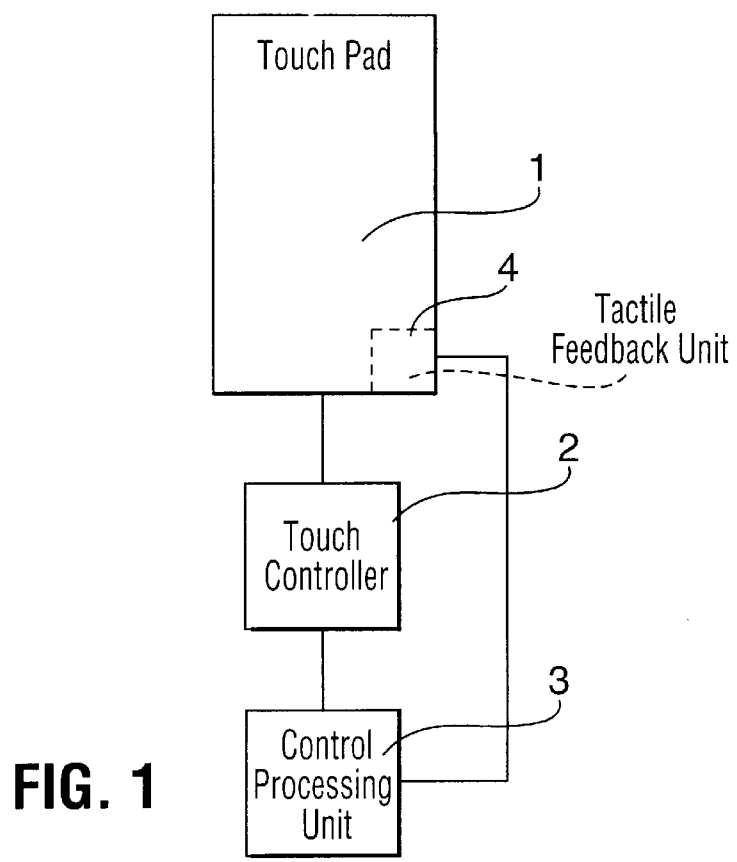
FIG. 1 schematically illustrates a touch pad feedback system in accordance with the present invention.

FIG. 1 schematically illustrates a standard touch pad 1 such as a keypad or a touch screen. The keypad consists of a keypad elastomer mounted on a printed circuit board such that conductive carbon pads under the keys connect adjacent conductors located on the printed circuit board. The touch screen may be an analog resistive, infrared, accoustic, capacitive or electromagnetic inductive operated device. Touch screens are normally laid over liquid crystal displays (LCD's) that display key positions as well as other information, however in the case of the electromagnetic inductive operated device, the touch sensitive screen is usually located under the LCD.

The touch pad 1 is connected to a touch controller 2 that controls the operation of the touch pad 1 and provides an output as a function of the position on the pad being touched. A user could input the keypad by finger touch unless the keypad is very small, however most keypads can also be inputted by using a pointer or a pen. All of the above touch screen devices except for the electromagnetic inductive device can be inputted by finger touch, however all of the touch screens can also be inputted by pen or pointer. For a touch screen, the touch screen controller generates x-y co-ordinate data corresponding to where the touch screen is being touched. To achieve this, the touch screen controller includes sensors and filters connected to the touch screen, apparatus to execute a predefined series of conversion computations and a host interface to output the data. The touch controller 2 is connected to the main control processing unit (CPU) 3 which processes the command inputted by the user on the touch pad 1.

In the system in accordance with the present invention, the CPU 3 generates a feedback control signal which is fed to a tactile feedback unit 4 connected to the touch pad 1. The tactile feedback unit 4 generates a mechanical vibration sensed by the user when the touch screen is touched. The activation is based on conditions predefined in the system user interface such as the location of the key pressed. The CPU 3 also controls the vibration frequency, amplitude and pulse length.

Figure 2:
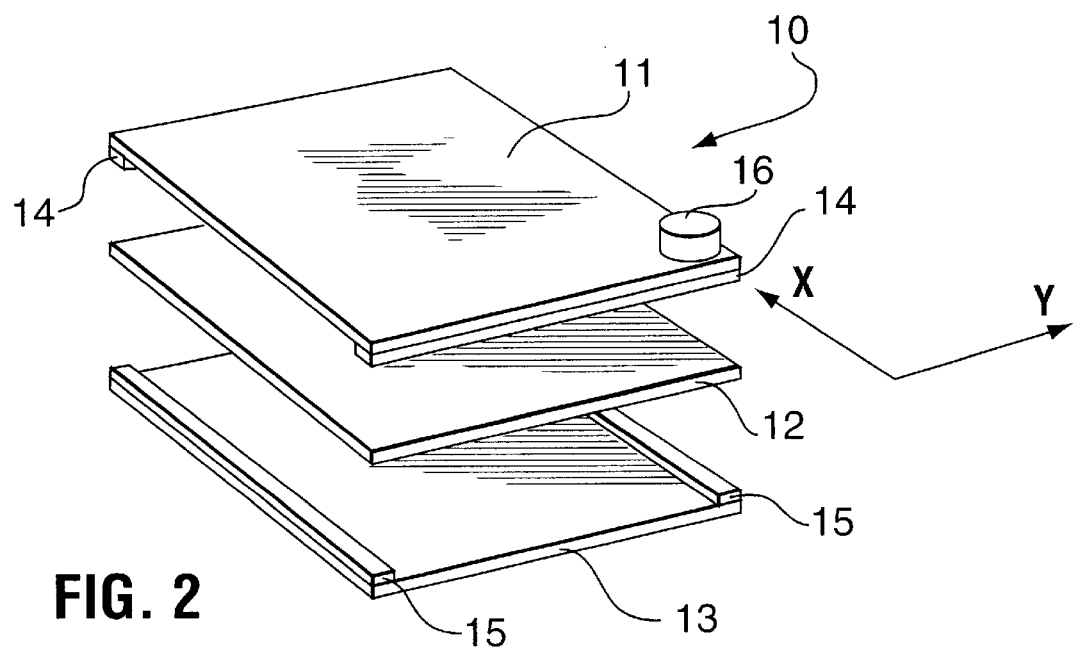
FIG. 2 illustrates one embodiment of a touch screen having a vibrator fixed to it to achieve tactile feedback.

FIG. 2 illustrates an analog resistive touch screen 10 consisting of a top layer 11, a spacer 12 and a bottom layer 13. The top layer 11 has a pair of bus bars 14 to measure the voltage gradient in the x-direction and the bottom layer 13 has a pair of bus bars 15 to measure the voltage gradient in the y-direction. In this embodiment, the screen 10 is a 3"×4" touch screen manufactured by Dynapro Systems, Inc. that is of the type of touch screens illustrated as drawing 95647 located on the Dynapro website—www.dynapro.com under products. However, other screens of different sizes and types can also be used in accordance with this invention. A vibrator 16 is fixed to the touch screen top layer 11 by a double-sided adhesive tape made by Sellotape in such as manner as to be capable of imparting a vibration to the touch screen 10. Other types of industrial quality glue can also be used. The vibrator 16 is normally fixed to the surface being touched so as to impart a direct vibration to the user. This surface is usually the touch screen for analog resistive, infrared, accoustic or capacitive operated devices, or the LCD for the electromagnetic inductive operated device. However, in the case of a keypad the vibrator can be fixed to the printed circuit board so that the vibrations are conducted to the user through the conductive carbon pads. The vibrator 16 in this particular embodiment is the Model F M 23 Pager Motor manufactured by Sanwa, it is described in U.S. Pat. No. 5,036,239 which issued to Yamagochi on Jul. 30, 1991. Other vibrators by Sanwa or other manufacturers can also be used, however, it has been determined that the preferred vibration frequency is between 100 and 5000 hz. The vibrations applied to the corner of the touch screen 10 may be sensed at any point on the surface 11. In addition to being sensed by a user's finger, the vibration may also be sensed by a user who is touching the layer 11 with a pen or a pointer.

As discussed above, the CPU 3 controls the both the pulse width and the amplitude of the mechanical vibrations of vibrator 16. The pulse width of the vibrations must be long enough to be felt but short enough to terminate before the next key touch. To achieve this, it has been determined that the minimum pulse width should be in the order 50 ms and the maximum pulse width should be in the order of 1000 ms in some applications, however a pulse width of 100 ms is preferable for most applications. With the particular motor referred to above, the amplitude and frequency of the vibrations are controlled by the voltage applied to the vibrator 16 by the CPU 3. These characteristics may be separately controlled in other types of vibrators. In this particular embodiment, the range of the applied voltage is 1 to 5 volts for short pulse durations.

In larger touch screens or touch screens that are inputted by a pointer or a pen, it may be desirable to have a stronger vibrator or several vibrators located on two or more points around the periphery of the screen.

Many modifications to the above described embodiments of the invention can be carried out without departing from the scope thereof, and therefore the scope of the present invention is intended to be limited only by the appended claims.

I claim:

1. A touch pad comprising:

touch pad means having a surface to be touched by a user to provide an output as a function of the location touched on the surface; and at least one vibrator fixed to the touch pad means surface to be touched to provide a tactile vibrating sensation to the user for a predetermined fixed time at a predetermined fixed frequency between 100 and 5000 Hz. when any location of the surface is being touched.

2. A touch pad comprising:

touch pad means having a surface to be touched by a user to provide an output as a function of the location touched on the surface; and at least one vibrator fixed to the touch pad means surface to be touched to provide a tactile vibrating sensation to the user for a predetermined fixed time between 50 ms. and 1000 ms. at a predetermined fixed frequency when any location of the surface is being touched.

3. A touch pad system comprising:

touch pad means having a surface to be touched by a user;

touch pad controller means for detecting and providing data representative of the point on the surface being touched by the user;

processor means for processing the data from the touch pad controller means; and at least one vibrator fixed to the touch pad means surface to be touched to provide a tactile vibrating sensation to the user for a predetermined fixed time at a predetermined fixed frequency between 100 and 5000 Hz. under the control of the processor when any point on the pad means surface is being touched.

4. A touch pad system comprising:

touch pad means having a surface to be touched by a user;

touch pad controller means for detecting and providing data representative of the point on the surface being touched by the user;

processor means for processing the data from the touch pad controller means; and at least one vibrator fixed to the touch pad means surface to be touched to provide a tactile vibrating sensation to the user for a predetermined fixed time between 50 ms. and 1000 ms. at a predetermined fixed frequency under the control of the processor when any point on the pad means surface is being touched.

5. A touch pad as claimed in claim 1 or claim 2 wherein the touch pad means is a touch screen.

6. A touch screen as claimed in claim 5 wherein the touch screen is analog resistive, infrared, acoustic, capacitive or electromagnetic inductive operated.

7. A touch pad system as claimed in claim 3 or claim 4 wherein the touch pad means is a touch screen.

8. A touch screen as claimed in claim 7 wherein the touch screen means is analog resistive, infrared, acoustic, capacitive or electromagnetic inductive operated.

* * * * *